United States Patent
Heywood (10) Patent No.: US 8,644,895 B2
(45) Date of Patent: Feb. 4, 2014

(54) PROTECTIVE DEVICE FOR PORTABLE ELECTRONIC DEVICE

(76) Inventor: Daniel Frederick Heywood, Reno, NV (US)

(*) Notice: Subject to any disclaimer, the term of this patent is extended or adjusted under 35 U.S.C. 154(b) by 241 days.

(21) Appl. No.: 13/210,062

(22) Filed: Aug. 15, 2011

(65) Prior Publication Data

US 2013/0045775 A1 Feb. 21, 2013

(51) Int. Cl.
*H04M 1/00* (2006.01)
*H04B 1/38* (2006.01)

(52) U.S. Cl.
USPC ........................ 455/575.8; 455/557

(58) Field of Classification Search
USPC ............ 455/550.1, 575.8, 556.1, 556.2, 557, 455/90.1, 90.3, 575.1; 379/443
See application file for complete search history.

(56) References Cited

U.S. PATENT DOCUMENTS

| | | | |
|---|---|---|---|
| 2005/0235813 A1* | 10/2005 | Barry | 84/723 |
| 2006/0187066 A1* | 8/2006 | Chen | 340/574 |
| 2007/0089521 A1* | 4/2007 | Mosely et al. | 73/702 |
| 2009/0174566 A1* | 7/2009 | Volk et al. | 340/691.5 |
| 2010/0321871 A1* | 12/2010 | Diebel et al. | 361/679.01 |
| 2012/0154126 A1* | 6/2012 | Cohn et al. | 340/10.51 |

* cited by examiner

*Primary Examiner* — Ping Hsieh
*Assistant Examiner* — Xin Jia (57) ABSTRACT

A protective device for a portable electronic device to draw attention to the user in an emergency is disclosed. A personal protective device for a portable electronic device comprising: a case configured to fit tightly around the portable electronic device such as a smartphone; at least one sound and/or light emitting device coupled with the case; one or more means for receiving an input, the input being configured to actuate the at least one sound and/or light emitting device; whereby the at least one sound and/or light emitting device is configured to generate a high volume of sound and/or light upon actuation thereby to attracting attention during an emergency. The sound and/or light emitting device is arranged inside the case and is capable of generating a high volume of sound and/or light in an emergency situation.

1 Claim, 10 Drawing Sheets

PROTECTIVE DEVICE FOR PORTABLE ELECTRONIC DEVICE

FIELD OF THE INVENTION

The present invention relates generally to the field of a protective device for a portable electronic device. More particularly, the present invention relates to a protective device for a portable electronic device which can also serve as a personal protection device for a user in case of a violent attack by another.

BACKGROUND

Over the past several years, cell phones, smartphones in particular, have made great advances in terms of their computational power and the complexity of the electronics they employ. They have also undergone some significant physical design changes that are driven by both the aesthetic goals of the product designers and the ability to shrink the necessary electronics to ever smaller sizes. These physical changes may result not only in a device with a more pleasing appearance, but which is also quite delicate and can be damaged easily. So it is often necessary to protect a portable electronic device by utilizing a protecting case.

Presently, a wide variety of portable electronic device protective cases are available in the market. These cases may have only marginal protective utility but provide some other feature such as an appearance that the user of the device believes to be more pleasing. The conventional protective cases of the smartphones may be made of flexible material such as leather that would be tailored to closely conform to the phone. This type of protective case offers several advantages when compared to rigid protective cases in that they allow some flexibility with regard to the precise physical dimensions and shape of the phone. Further, these cases can often be used with more than one model of phone.

However, the conventional flexible protective cases make the process of using the phone more cumbersome and may significantly detract from the appearance of the device. Therefore there is a need of an improved case for protecting the portable electronic device. More importantly the case could also be used as a device to protect the user from violent or non-violent attack while in use. The needed device would be a rigid case which may be made of substantially rigid material such as thermoplastic. Further, such a device would have an ability to create a single rigid physical unit comprised of the phone and case.

This needed device would be one of a category of devices integrating functional accessories of the device with the phone itself resulting in a single unit that the user can treat as a single device. Such devices might have the ability to communicate with the portable electronic devices they protect and transfer data and energy between them. The immediate needed device would have at least one input which would activate and/or deactivate the features of the device corresponding to an external input. Moreover, the device would have at least one sound and/or light emitting device arranged inside of it to generate a high volume of sound and/or light to deter violent and/or nonviolent attack against a user by attracting attention from the public in order to receive help.

SUMMARY OF PREFERRED EMBODIMENT OF THE INVENTION

Advantages of One or More Embodiments of the Present Invention

The various embodiments of the present invention may, but do not necessarily, achieve one or more of the following advantages:

The ability to activate the at least one sound and/or light emitting device when an attack is identified.

The ability to generate high volume of sound and/or light in order to draw attention to the user in case of an emergency.

The ability to attract attention and receive help by the user.

The ability to removably place a portable electronic device inside the personal protective device.

The ability to enable the personal protective device to communicate with the portable electronic device by a physical electrical connection through an input/output port of the portable electronic device.

The ability to derive energy from energy storage medium associated with the portable electronic device.

The ability to supply the portable electronic device with energy derived from the energy storage medium of the protective device.

The ability to provide a self-defense utility in a device that can be very closely integrated with a mobile electronic device without significantly detracting from the form or function of the mobile device, thus removing potential reasons an individual might be hesitant to use such a device.

These and other advantages may be realized by reference to the remaining portions of the specification, claims, and abstract.

BRIEF DESCRIPTION OF A PREFERRED EMBODIMENT OF THE PRESENT INVENTION

In a preferred embodiment, the present invention comprises a case configured to fit tightly around the portable electronic device; at least one sound and/or light emitting device coupled with the case; one or more means for receiving an input, the input being configured to actuate the at least one sound and/or light emitting device, whereby the at least one sound and/or light emitting device is configured to generate a high volume of sound and/or light upon actuation thereby to attract attention during an emergency. The case may optionally have a front side, a back side, a top side, a bottom side, a left side and a right side. A sliding switch may be attached at the right side of the case to prevent unintended activation or deactivation of the personal protective device. An activation button may be positioned at the right side of the case and an additional activation button may be positioned at the left side of the case to allow the device to be triggered in a manner that reduces the risk of accidental triggering. Optionally, a headphone port is positioned at the top side to allow for the connection of a headphone to a portable electronic device. A button access port may be arranged at the top side of the device for accessing a power button of the portable electronic device. An additional button access port may be arranged at the left side of the device for access additional buttons of the portable electronic device. The battery port may be positioned at the front side of the device for inserting or removing a battery. A camera port may be arranged at the front side and back side of the device. A sound port may be arranged at the back side of the device and a dock connector access at the bottom side of the device for connecting the portable electronic device to an external resource. At least one sound and/or light emitting device is arranged inside the case for generating high volume of sound and/or light during a violent or nonviolent attack against a user thereby allowing the user to attract attention and receive help.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF AN EMBODIMENT OF THE PRESENT INVENTION

In the following detailed description of the preferred embodiment, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The following is a listing of some important elements of the invention together with a description of how each fits in with an embodiment of the present invention.

Case.

The personal protective device 1 having the case 2 which may include a front side 3, a back side 4, a top side 5, a bottom side 6, a left side 7 and a right side 8, and which may be comprised of a front shell 19, a back shell 20, an inner plate 21, and an electronics cavity 22 in accordance with the present invention.

Sliding Switch.

Figure 2:
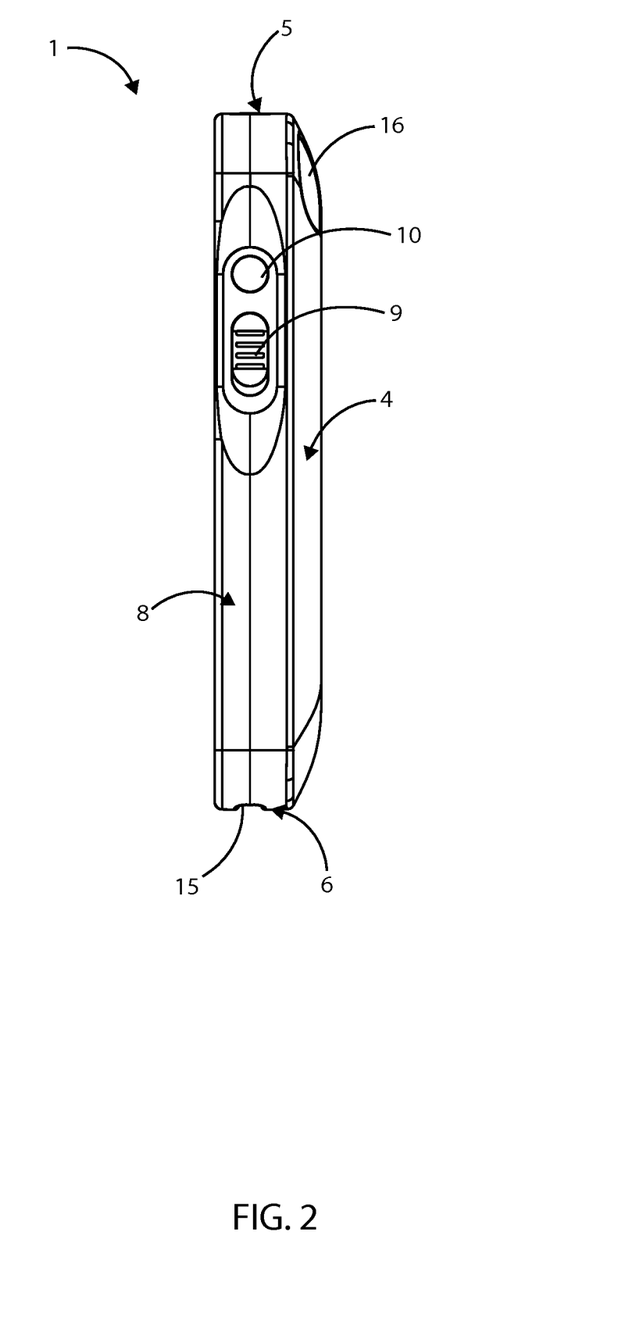
FIG. 2 is substantially a right side perspective view of the preferred embodiment of the present invention.

The sliding switch 9 is attached at the right side 8 of the case 2 to prevent unintended activation or deactivation of the personal protective device 1.

First Activation Button.

The first activation button 10 is positioned at the right side 8 of the case 2 to allow for the activation or deactivation of the device 1 while working in conjunction with the second activation button 11 to reduce the risk of accidental triggering.

Second Activation Button.

Figure 3:
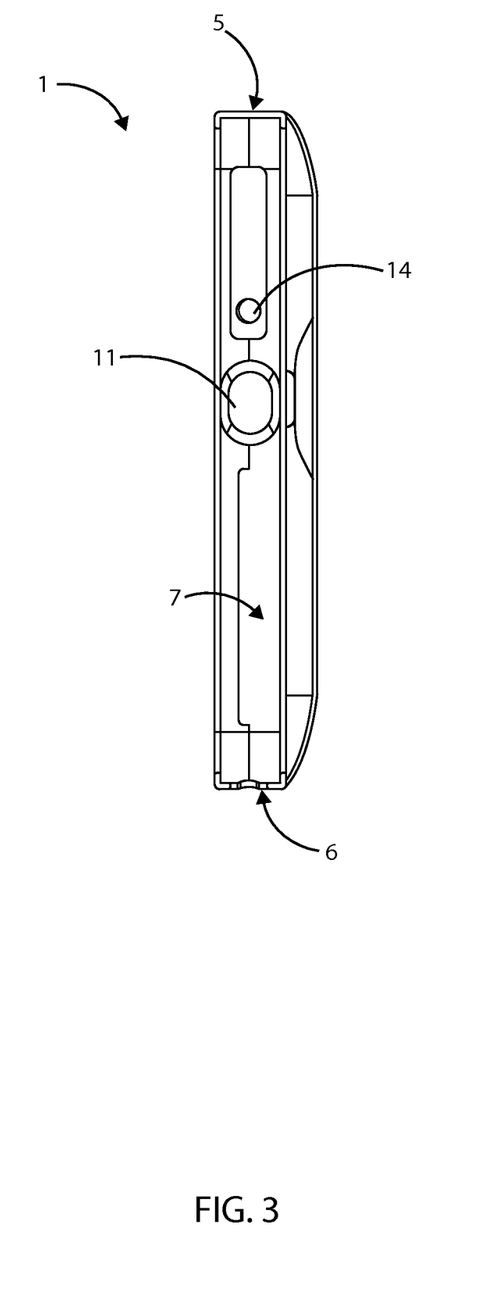
FIG. 3 is substantially a left side perspective view of the preferred embodiment of the present invention.

The second activation button 11 is positioned at the left side 7 of the case 2 to allow for the activation or deactivation of the device 1 while working in conjunction with the first activation button 10 to reduce the risk of accidental triggering.

Headphone Access Port.

Figure 6:
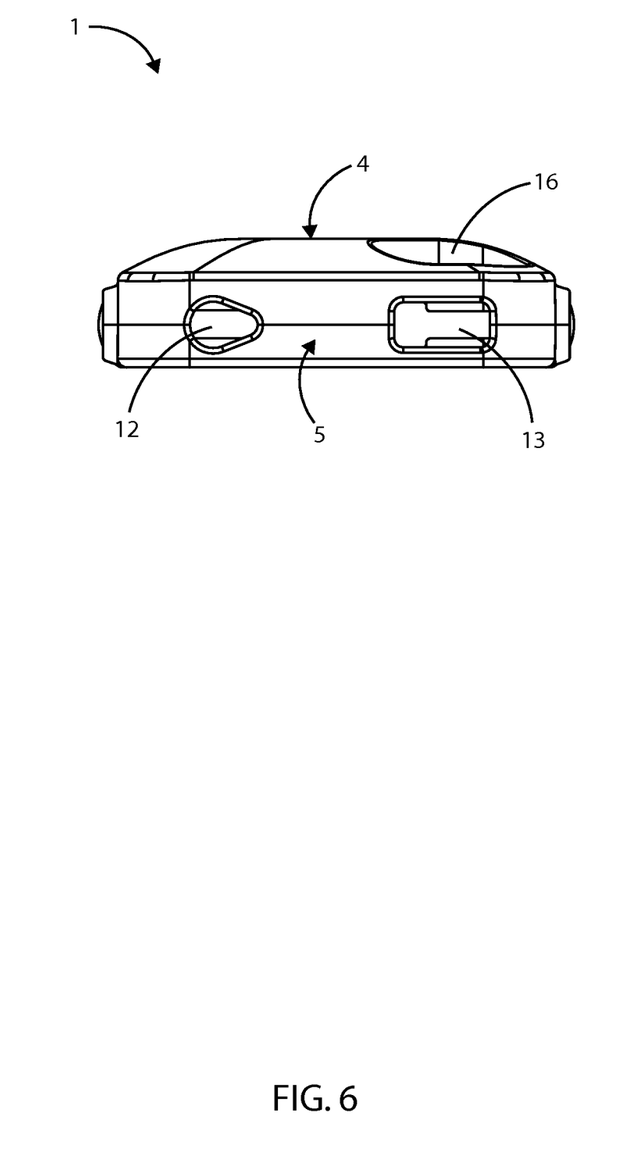
FIG. 6 is substantially a top perspective view of the present invention.

The headphone access port 12 is positioned at the top side 5 to allow for the connection of a headphone to the portable electronic device.

First Button Access Port.

The first button access port 13 is arranged at the top side 5 for accessing a power button of the portable electronic device.

Second Button Access Port.

The second button access port 14 is arranged at the left side 7 for accessing additional buttons of the portable electronic device.

Battery Port.

Figure 4:
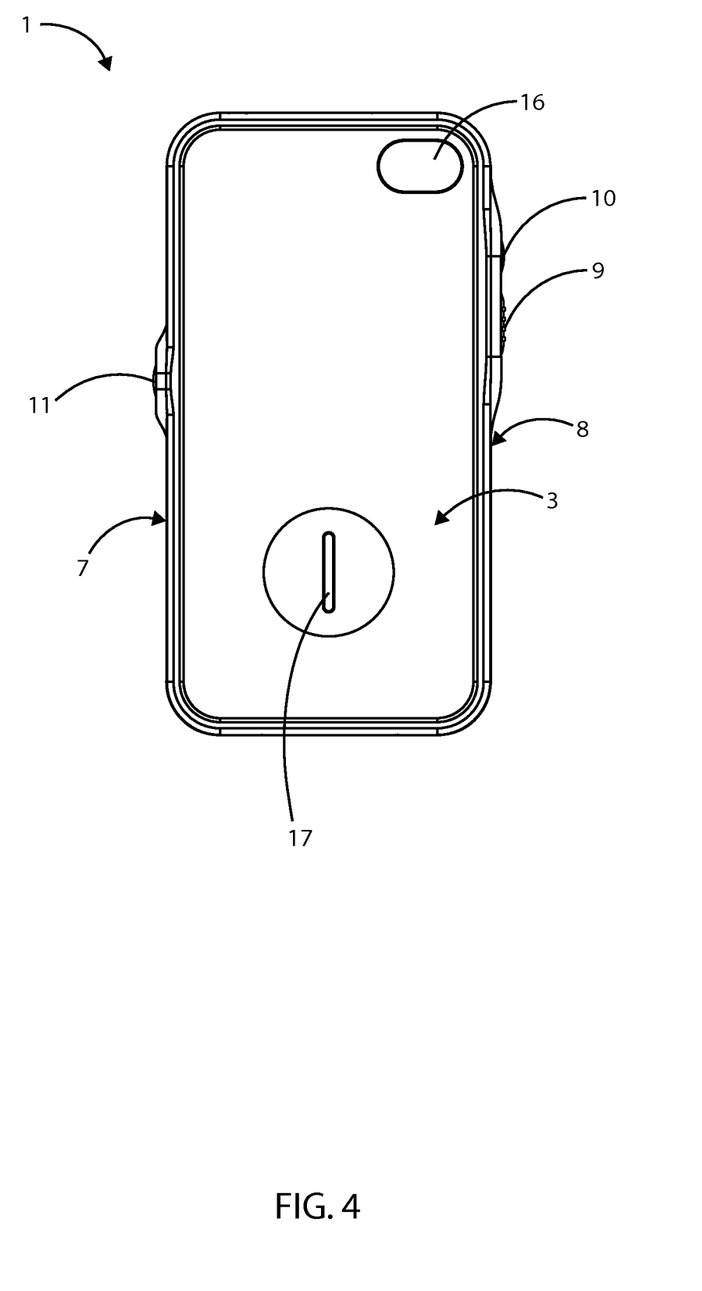
FIG. 4 is substantially a front view of the present invention.

The battery port 17 is positioned at the front side 3 for inserting or removing a battery.

Camera Port.

The camera port 16 is arranged at the front side 5 of the device 1.

Sound Port.

Figure 5:
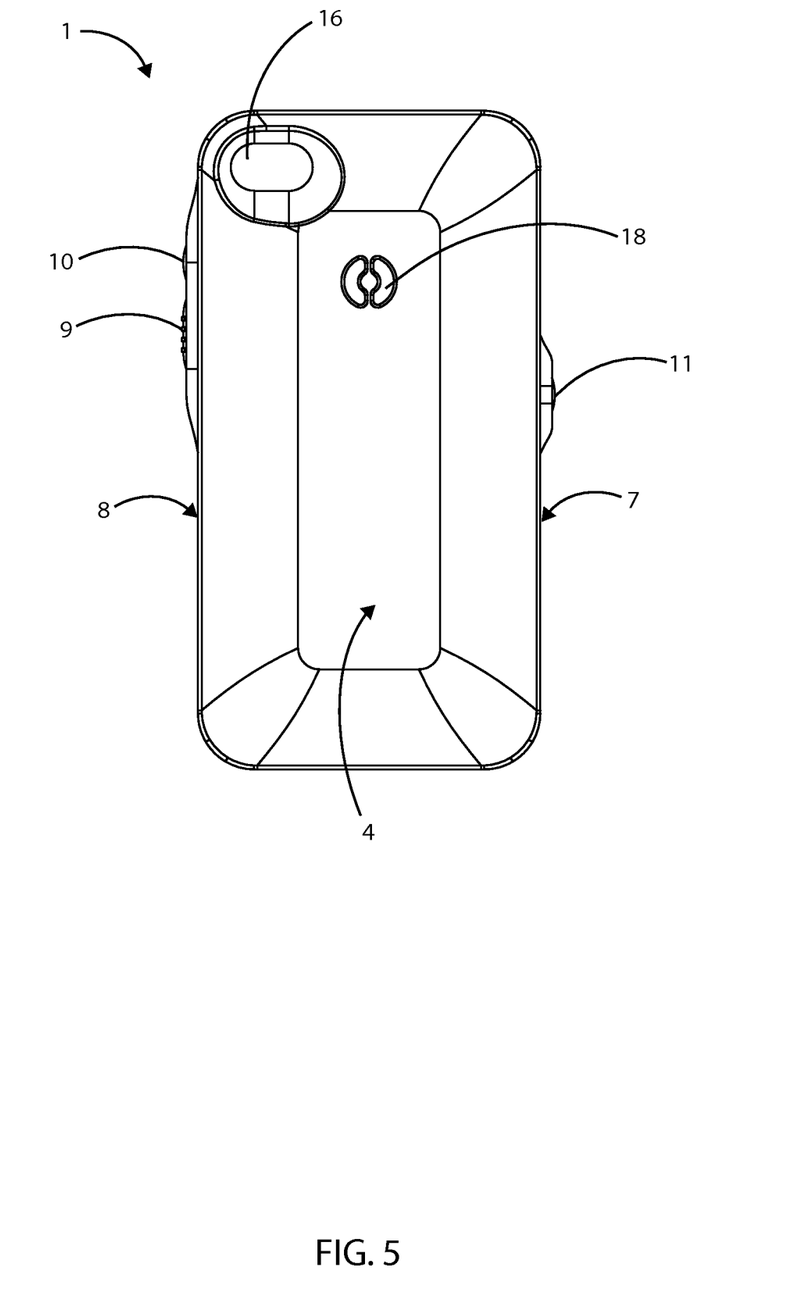
FIG. 5 is substantially a rear view of the present invention.

The sound port 18 is arranged at the back side 4 of the device 1 to produce high volume sound.

Dock Connector Access Port.

Figure 1:
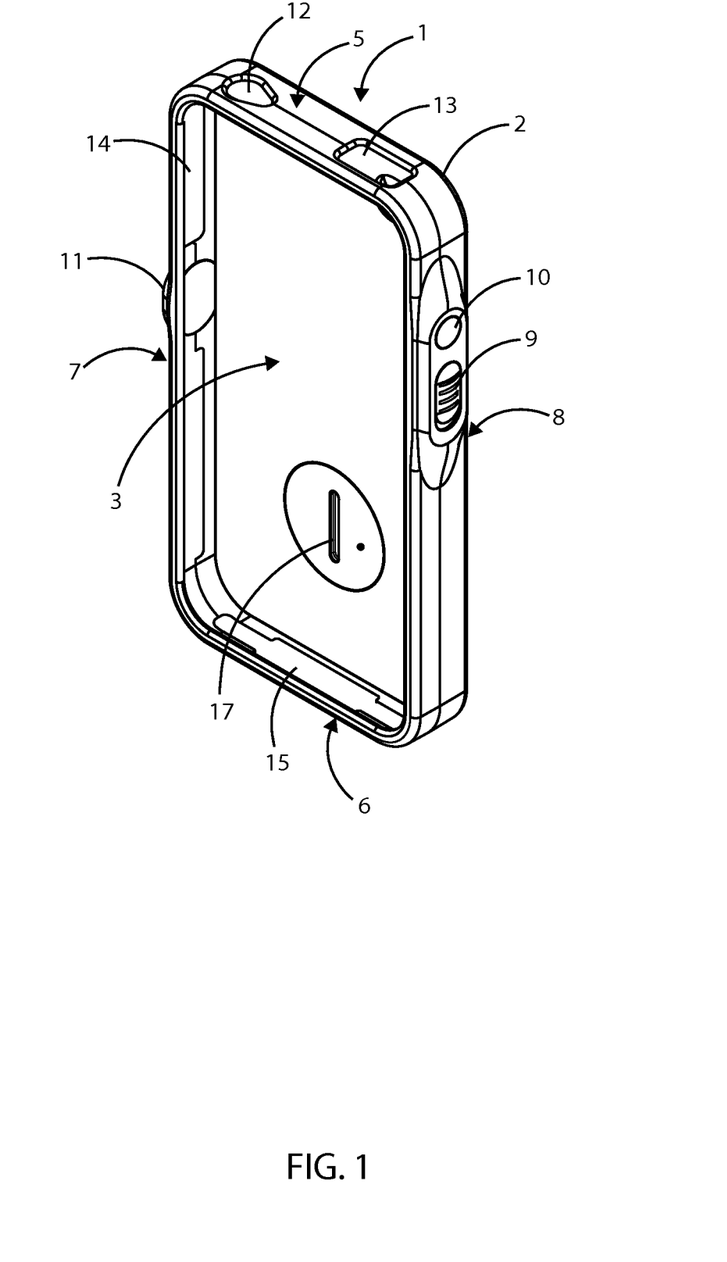
FIG. 1 is substantially an isometric view of the preferred embodiment of the present invention.

The dock connector access port 15 is arranged at the bottom side 6 of the device 1 for connecting the portable electronic device to an external resource (not shown).

At Least One Sound and/or Light Emitting Device.

Figure 7:
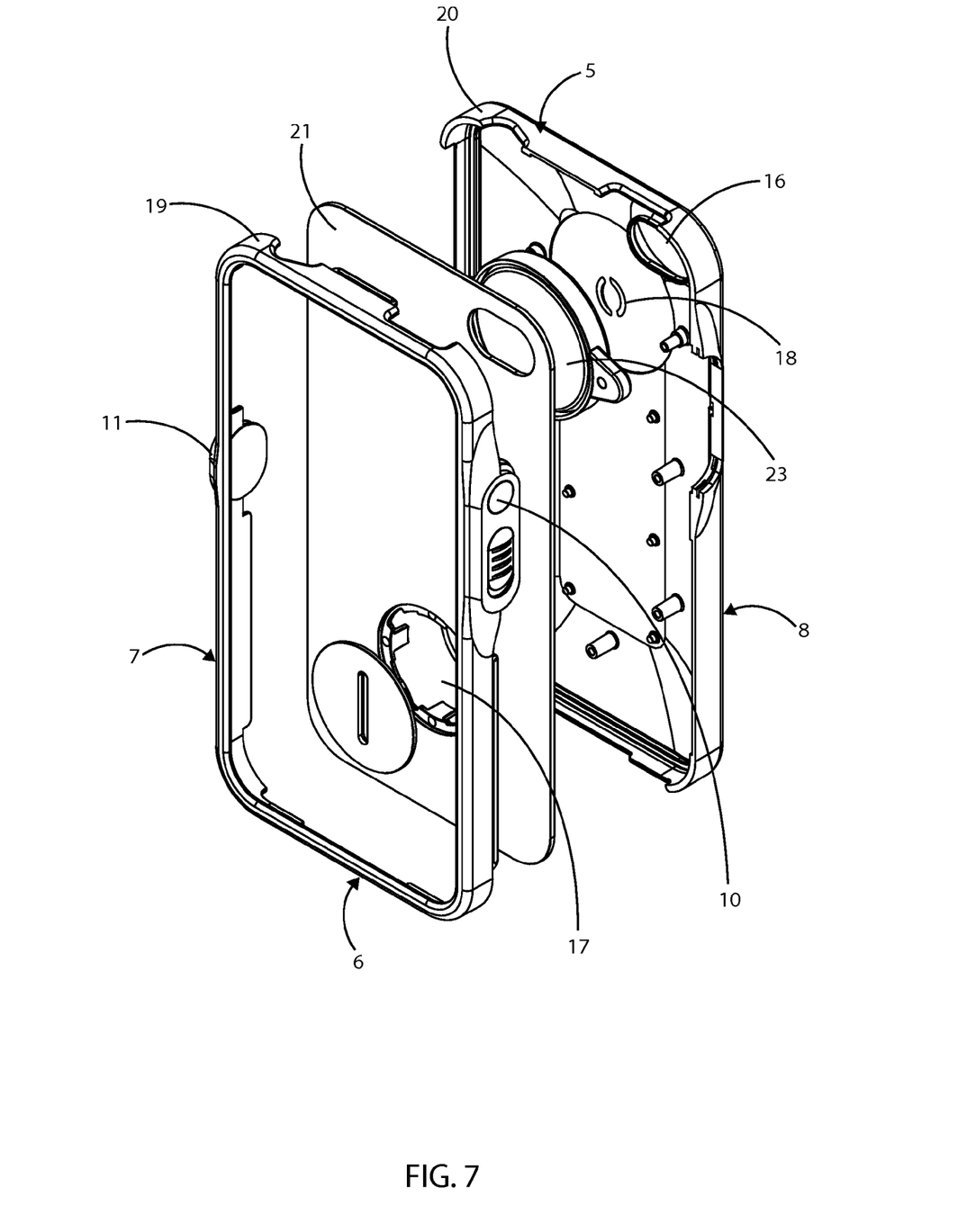
FIG. 7 is substantially an exploded view of the present invention.
Figure 8:
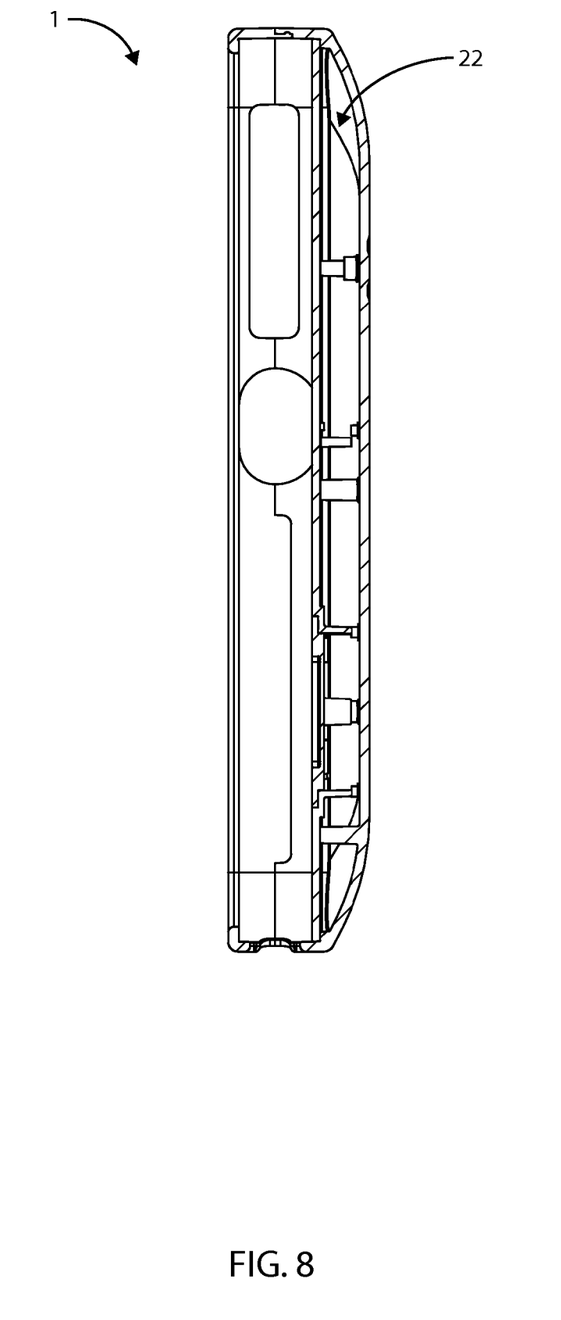
FIG. 8 is substantially a side cross-sectional view of the present invention.

The at least one sound and/or light emitting device 23 is arranged inside the electronics cavity 22 of the case 2. This device functions to call attention to the user in an emergency. This element may be capable of emitting a high volume of sound, a high volume of light, or both.

The present invention comprises a personal protective device 1 for a portable electronic device (not shown) to summon help to the user in an emergency. The device 1 may include a case 2 having a front side 3, a back side 4, a top side 5, a bottom side 6, a left side 7 and a right side 8. The sliding switch 9 is attached at the right side 8 of the case 2 to prevent unintended activation or deactivation of the device 1. An activation button 10 is positioned at the right side 8 of the case 2 and an additional activation button 11 is positioned at the left side 7 of the case 2 to reduce the risk that the user may accidentally trigger the device 1. A headphone port 12 is positioned at the top side 5 to allow the connection of a headphone to the portable electronic device. The first button access port 13 is arranged at the top side 5 of the device 1 for accessing a power button of the portable electronic device. An additional button access port 14 is arranged at the left side 7 of the device 1 for accessing additional buttons of the portable electronic device. The battery port 17 is positioned at the front side 3 of the device 1 for inserting or removing a battery. A camera port 16 is arranged at the front side 3 and back side 4 of the device. A sound port 18 is arranged at the back side 4 of the device 1 and a dock connector access port 15 is arranged at the bottom side 6 for connecting the portable electronic device to an external resource. At least one sound and/or light emitting device 23 is arranged inside the case 2 for generating high volume of sound and/or light in an emergency such as an attack against a user thereby allowing the user to attract attention and receive help.

The portable electronic device (not shown) would likely be a smartphone. However the device may also comprise a camera, tablet computer, laptop computer or other portable electronic device. The personal protective device 1 may be electrically coupled to the portable electronic device (not shown). The device 1 may operate by deriving energy from energy storage medium associated with the portable electronic device. The personal protective device 1 may communicate with the portable electronic device by a physical electrical connection through an input/output port of the portable electronic device. The personal protective device 1 may also communicate by means of a wireless communication system. The device 1 may be constructed by a substantially rigid material such as thermoplastic.

The at least one sound and/or light emitting device 23 is normally in an inactive state and is placed into an active state by a substantially accident resistant input. The substantially accident resistant input may be actuated when an emergency is identified. The at least one sound and/or light emitting device 23 activates by providing it a steady voltage and/or providing it a proper time varying signal. They cannot be removed by the user during any intended use of the portable electronic device. The substantially accident resistant input of the personal protective device 1 may be comprised of one or more sensors (not shown) such as resistive touch sensors, capacitive touch sensors, electromechanical switches, or a combination of these three. The one or more sensors work to activate and/or deactivate the other features of the device corresponding to an external input.

The purpose of the present invention is to provide this basic self-defense utility that can be very closely integrated with a portable electronic device. The sound and/or light emitting device can generate a high volume sound by means of the release of a pressurized gas, a chemical reaction and an electrically inducted vibration. If there are more than one sound/light emitting devices, they may have identical acoustical characteristics. The sound/light emitting devices may have substantially different acoustical characteristics. The sound and/or light emitting device may derive power from energy stored in a battery or some other energy storage medium that is electrically separate from the portable electronic device. The sound and/or light emitting device may derive power from energy stored in the electrical energy storage medium of the portable electronic device. The energy storage medium may be recharged by means of, an external power supply intended for the recharging of the portable electronic device or an external power supply intended solely for the protective device itself.

The light emitting device in the present invention may be selected from a group consisting of light emitting diodes, incandescent lighting elements and fluorescent lighting elements. The light emitting device may be coupled to the electrical system of the personal protective device 1. Additionally, the electrical control system of the device may command the light emitting device to perform some action. When activated, the light emitting device serves to increase the visibility of the device and draw attention to the user. The advantages of the light emitting device may consist of periodic flashing and rapid changes in color. If the device 1 includes a plurality of light emitting devices they may be grouped together as to perform the same actions or they may operate independently. The light emitting devices may be activated and deactivated in conjunction with the other features of the device such as the sound emitting device. The light emitting devices may be integrated into the body of the device 1 such that the plurality of light emitting devices does not substantially alter the form or function of the portable electronic device. Additionally, the light emitting devices might be integrated into the body of the device in a substantially permanent manner.

The personal protective device 1 may also have an ancillary utility to provide auxiliary energy storage for the operation of the portable electronic device itself, thus potentially extending the operable time of the portable electronic device. If the device 1 serves to provide the auxiliary energy storage for the portable electronic device, it might include a mechanism to limit the amount of energy consumed by the portable electronic device in order to maintain the functionality of the protective device's features. The electrical energy storage medium of the portable electronic device may be permanently integrated into the physical structure of the device 1 or it may be removable.

The personal protective device 1 is composed of at least one plastic component with at least one cavity 22, or at least one recess (not shown) and/or some other physical feature to accommodate the features of the device. The at least one cavity 22, or the at least one recess (not shown) describes physical features of the device 1 meant to cleanly integrate, in a manner removed from the user, the sound and/or light emitting element and any other features of the device with the physical body of the device 1 and the portable electronic device which it contains. Alternatively, the device 1 may be composed of an assembly containing a plurality of components; the assembly containing at least one cavity, at least one recess (not shown), or other physical feature to accommodate the features of the device. The at least one cavity, the at least one recess or otherwise described physical features may be designed into a single component or they might be formed from the assembly of the components. The at least one cavity might be formed by the assembly of an inner plate 21 and a back shell 20.

Figure 9:
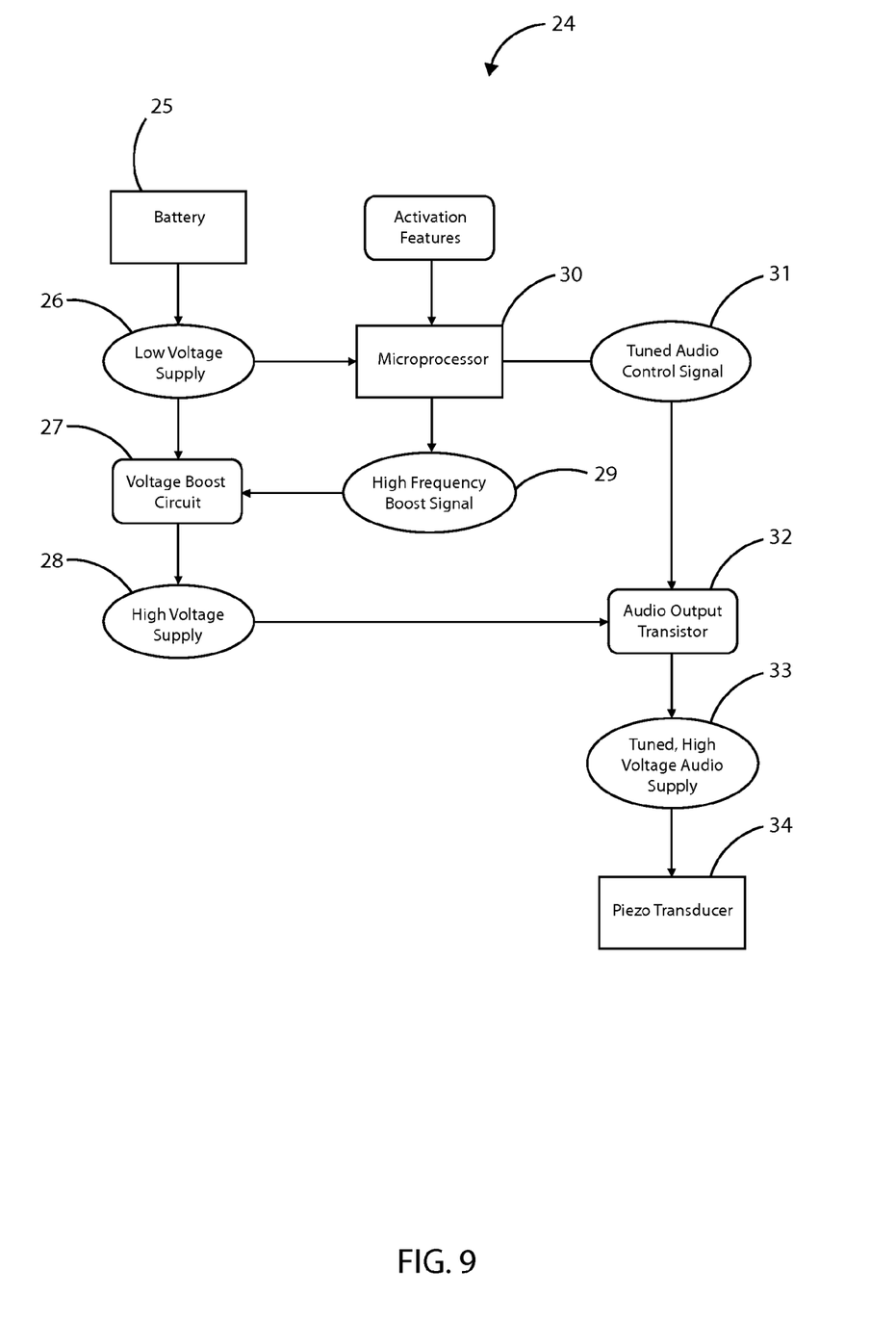
FIG. 9 is substantially an electrical block diagram illustrating the working of an electrical circuit.

The personal protective device 1 has an electrical circuit 24 which may operate entirely independent of the portable electronic device. The at least one sound and/or light emitting device 23 is taken to an active state by providing it with a steady voltage or by providing it a proper time varying signal. The electrical control circuit 24 comprises a collection of components such as a battery 25 providing a low voltage supply 26, a voltage boost circuit 27 providing a high voltage supply 28, a microprocessor 30 providing a high frequency boost signal 29 and a tuned audio control signal 31, an audio output transistor 32 receiving a high voltage supply 28 and tuned audio control signal 31 and outputting a tuned high voltage audio supply 33, and a piezo transducer 34 receiving the tuned high voltage audio supply.

A piezoelectric transducer (as in element 34) is a device that uses the piezoelectric effect to cause a change in the mechanical size or shape of a certain physical element as a result of a change in a received electrical signal. Piezoelectric transducers can also be used to measure pressure, acceleration, strain or force by producing an electrical charge whose magnitude corresponds to the value of the measured parameter. Piezoelectric transducers are electromechanical systems that can be used to generate an audible sound arising from the periodic nature of a received electrical signal and the corresponding periodic change in the physical size or shape of the transducer.

The electrical control circuit 24 may include a mechanism or design to reduce the electrical current drawn by the circuit 24 when the device 1 is in an inactive state, thereby prolonging the battery life.

Alternatively, the electrical circuit 20 may have a feature of data interaction between the personal protective device 1 and the portable electronic device. The device 1 may receive inputs from the portable electronic device and/or provide outputs to the portable electronic device. When the personal protective device 1 receives a certain unique input from the portable electronic device, the device 1 actives its features and when it receives another unique input from the portable electronic device, the device 1 deactivates the features. If the portable electronic device is a mobile phone, the mobile phone can act upon an input it receives from the personal protective device 1 and perform some action such as placing a phone call to an emergency telephone number or sending some form of data transmission, such as an SMS message with relevant information, possibly including location information, to a recipient.

Figure 10:
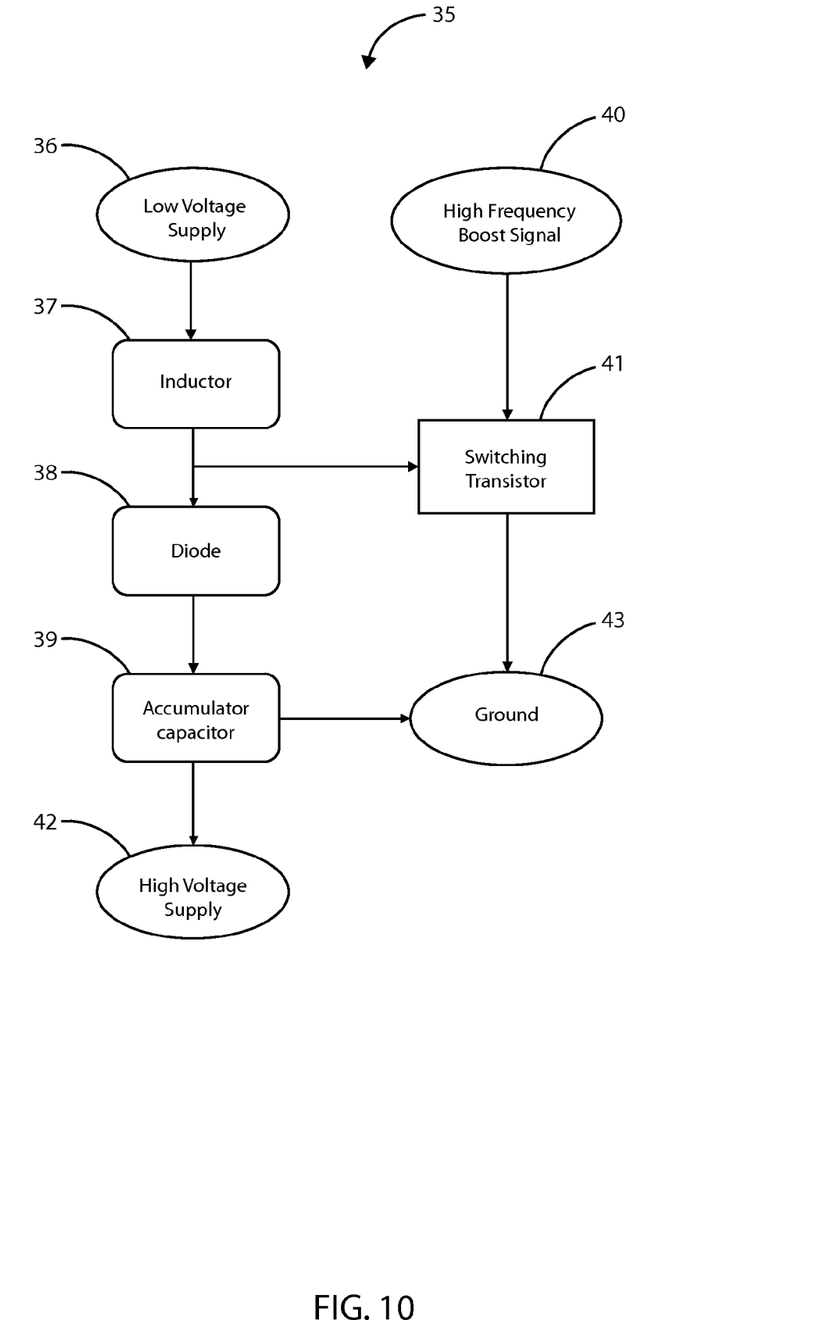
FIG. 10 is substantially an electrical block diagram illustrating the working of a voltage boosting mechanism.

One of the main advantages of this device 1 is a voltage increasing mechanism which functions to increase the voltage provided to the sound and/or light emitting device. This mechanism potentially increases the volume of the sound and/or light emitting device for a given physical size and thus increases the utility of the device 1. The voltage increasing mechanism functions as a result of rapid and periodic state changes to some element or elements in an electrical circuit 24. The personal protective device 1 operates on power derived from energy stored by the portable electronic device itself, which may be low voltage, or on power derived from energy stored by the personal protection device, which also may be low voltage. The voltage boost circuit 35 is designed for boosting this low voltage and supplying high voltage to the personal protective device 1.

The voltage boost circuit 35 may operate as a standard boost converter. The voltage boost circuit 35 comprises a plurality of elements, signals, outputs, and sources such as a low voltage supply 36, an inductor 37, a diode 38, an accumulator capacitor 39, a high frequency boost signal 40, a switching transistor 41, a high voltage supply 42 and a ground 43. The inductor 37 is charged when it is connected between ground 43 and the low voltage supply 36 and upon being disconnected it generates a voltage spike which runs through the diode 38 and charges the accumulator capacitor 39. The accumulator capacitor 39 is connected between ground 43 and the low voltage supply 36 through an inductor 37 and diode 38. The switching transistor 41 receives a periodic control signal which causes it to rapidly connect and disconnect the inductor 37 to ground 43. The diode 38 prevents the high voltage charge on the capacitor 39 from being discharged to the low voltage supply 36 through the inductor 37 or to ground 43 through the switching transistor 41. The accumulator capacitor 39 is the high voltage output point. The active function of the inductor 37 is based on the periodic nature of the current flow in the circuit 35, yielding a peak voltage potential with a magnitude substantially above that of the circuit input voltage.

In order to realize some form of data interaction with the device 1, the portable electronic device may make use of a dedicated software application. The software application is designed for facilitating data interaction such that it can properly format the data for communication to the personal protective device 1 and properly interpret data received from the device 1. The software application may also be designed to allow the user to simply and easily active and deactivate the device 1, such as by means of a large on-screen button that the user touches. Further, the software application may also including features to prevent unintended activation or deactivation of the device 1, such as requiring a code to be entered or a series of actions to be taken. Additionally, the software application may act on inputs received from the portable electronic device by collecting information such as GPS location coordinates, gyroscope and/or accelerometer data, and/or any other relevant data and sending them along with a message of some sort to a recipient. Finally, the software application may also perform some action such as automatically dialing an emergency phone number upon an input from the device.

Regardless of whether the personal protective device 1 has the feature of data interaction with the portable electronic device, the personal protective device 1 may include hardware for the activation and deactivation of the device features. The personal protective device 1 may include a one or more sensors (not shown) such as resistive touch sensors, capacitive touch sensors, electromechanical switches, and a combination of these three. The one or more sensors serve as activation/deactivation input features, placing the device in an active or inactive state in response to an input. The activation/deactivation input features might be arranged in a manner such that the risk of accidentally triggering the device 1 is reduced while the ease with which the device 1 can be intentionally triggered is not substantially impeded. The device 1 may make use of a time accumulation threshold to diminish accidental triggering, wherein the activation/deactivation input features must be maintained in a given state for a certain period of time before the device 1 will change the feature activation state. Additionally, the device 1 may make use of an activation/deactivation input feature configuration wherein one of the input features serves as a safety switch, placing the device in one of either an "armed" or "disarmed" state. The safety switch might also serve to prevent unintended deactivation, wherein the device may require that it is in either "armed" or "disarmed" state before deactivating the features. Alternatively, the device 1 may make use of a multiple action activation/deactivation input feature. Such a feature may requires multiple, successive changes before instructing the device to change activation state.

The personal protective device 1 may include at least one tactile pushbutton along with a two-state sliding switch 9. If the sliding switch 9 was in its "disarmed" state, the device 1 may remain in a dormant state and cannot be triggered by the momentary pushbutton. If the sliding switch 9 was in its "armed" state, the device is still in a dormant state but ready to change to an active state if the pushbutton is depressed for a certain period of time. In order to activate the device 1, the user wants to place the sliding switch 9 in the "armed" position and then depress the pushbutton until the activation time threshold is reached. In general, the activation/deactivation input features of the device 1 may be coupled to the electrical control system of the device 1, to the portable electronic device itself, or directly to the features of the device 1.

The device 1 may be designed to receive the portable electronic device in any of a number of ways. It might receive the portable electronic device through an opening which can accommodate the insertion and removal of the portable electronic device without undergoing deflection or some other physical change. The portable electronic device may be retained within the personal protective device 1 by means of friction between the portable electronic device and the surfaces of the personal protective device which it contacts. The personal protective device 1 may also receive the portable electronic device through an opening which allows for the insertion and removal of the portable electronic device as a result of the deflection or other physical dislocation of one or more physical elements or components of the personal protective device 1. Alternatively, the personal protective device 1 may receive the portable electronic device by the removal of one or more components of the assembly relative to the other components of the assembly. In such a case the personal protective device 1 may receive the portable electronic device with the component removed.

The physical body of the personal protective device 1 may include a number of potential features to increase the utility of the device. The device might be designed such that the body of the device acts as an acoustic wave guide for the sound emitting device thereby increasing the volume. The wave guide would generally serve to provide an impedance match between the sound emitting device and the ambient air, thus minimizing unwanted sound reflections and maximizing the efficiency of the power transfer. The device 1 might be designed such that the wave guide is contained within the design of one or more of the physical components, or is formed from the assembly of multiple components. Also, the device 1 may be designed such that the wave guide exists in manner such that it is substantially parallel to, and substantially conforms to, one or more of the surfaces of the portable electronic device. In the case that the device 1 contains more than one sound emitting device, the wave guide might be designed such that it receives sound waves generated by all the sound emitting devices and merges the waves to be outputted in a beneficial manner, or outputs them separately. The device 1 may also contain more than one acoustic wave guide.

The physical body of the device may include openings to allow access to the user interface, sensing, recharging and other features and elements of the portable electronic device. Additionally, the device 1 may also include removable coverings for these openings. This may be accomplished in the case of a multi component device with a removable component or section, by designing the physical body of the device such that the removal of the component or section allows access to the obstructed features. Additionally, the user interface, sensing, recharging and other features and elements of the portable electronic device may be accessed by displacing, in a manner such that they are still attached to the protective device, one or more components or sections. This may be accomplished by means of a rotation, deflection, or linear translation.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A personal protective device for a portable electronic device comprising:

a. a case configured to fit tightly around the portable electronic device;
   b. at least one sound and/or light emitting device integrated into the case;
   c. one or more means for receiving an input, the input being configured to actuate the at least one sound and/or light emitting device; whereby the at least one sound and/or light emitting device is configured to generate a high volume of sound and/or light upon actuation thereby attracting attention during an emergency, wherein the case includes having a front side, a back side, a top side, a bottom side, a left side and a right side, further comprising:
      i. a sliding switch attached at the right side of the case to prevent unintended activation and unintended deactivation of the device;
      ii. an activation button positioned at the left side of the case to activate the device in a manner which reduces the risk of accidental triggering;
      iii. an activation button positioned at the right side of the case to activate the device in a manner which reduces the risk of accidental triggering;
      iv. a headphone port positioned at the top side to allow the connection of a headphone to the portable electronic device;
      v. a button access port arranged at the top side for accessing a power button of the portable electronic device;
      vi. a button access port arranged at the left side for accessing additional buttons of the portable electronic device;
      vii. a battery port positioned at the front side for inserting or removing a battery;
      viii. a camera port arranged at the front and back sides of the device;
      ix. a sound port arranged at the back side of the device to produce high volume of sound; and
      x. a dock connector access port arranged at the bottom side of the device for connecting the portable electronic device to an external resource.

* * * * *